United States Patent [19]
Kunze

[11] Patent Number: 5,198,954
[45] Date of Patent: Mar. 30, 1993

[54] MAGNETIC-TAPE-CASSETTE APPARATUS COMPRISING A MANUALLY OPERABLE CASSETTE DRIVE

[75] Inventor: Norbert Kunze, Ehringshausen, Fed. Rep. of Germany

[73] Assignee: U.S. Philips Corporation, New York, N.Y.

[21] Appl. No.: 908,510

[22] Filed: Jun. 30, 1992

Related U.S. Application Data

[63] Continuation of Ser. No. 605,894, Oct. 29, 1990, abandoned.

[30] Foreign Application Priority Data

Oct. 28, 1989 [DE] Fed. Rep. of Germany ....... 3936076

[51] Int. Cl.⁵ ............................................. G11B 15/44
[52] U.S. Cl. .................................. 360/137; 360/74.1
[58] Field of Search ............... 360/137, 74.1, 93, 96.1, 360/96.5

[56] References Cited

U.S. PATENT DOCUMENTS

| | | | |
|---|---|---|---|
| 3,432,169 | 3/1969 | Schroder | 360/137 X |
| 4,503,476 | 3/1985 | Kommoss et al. | 360/137 |
| 4,630,148 | 12/1986 | Deutsch et al. | 360/93 |
| 4,827,785 | 5/1989 | Kunze | 360/137 X |
| 4,916,568 | 4/1990 | Gerhard | 360/137 |

*Primary Examiner*—John H. Wolff
*Attorney, Agent, or Firm*—Brian J. Wieghaus

[57] ABSTRACT

A manually operable cassette drive mechanism with actuating rods associated with the fast forward, reverse and eject functions in which the actuating rod for the eject function is coupled to the actuating rods for the fast forward and reverse functions whereby the actuating rods for the fast forward and reverse functions are moved together with the movement of the actuating rod for the eject function and vice-versa.

17 Claims, 2 Drawing Sheets

MAGNETIC-TAPE-CASSETTE APPARATUS COMPRISING A MANUALLY OPERABLE CASSETTE DRIVE

This is a continuation of application Ser. No. 07/605,894, filed on Oct. 29, 1990, now abandoned.

BACKGROUND OF THE INVENTION

1. Field of the Invention

The invention relates to a magnetic-tape-cassette apparatus comprising a manually operable cassette drive and including key buttons as well as actuating rods associated thereto which perform, over the length of their guides in the drive of the magnetic-tape-cassette apparatus the fast forward and reverse functions as well as the eject function, while the actuating rod for the eject function can be coupled to the actuating rods for fast forward and reverse functions.

2. Description of the Related Art

A magnetic-tape-cassette apparatus of the type referred to above is known from EP-OS 0 138 268, to which U.S. Pat. No. 4,611,254, corresponds. The connection between the actuating rods for fast forward and reverse functions and the actuating rod for the eject function then has for its object, when the actuating rods for fast forward and reverse functions are depressed, to take along the actuating rod for the eject function, thus to withdraw it simultaneously, so that when depressing only the two actuating rods for fast forward and reverse functions also the eject function may be performed. A three-key apparatus can thus be converted into a two-key apparatus. This achieves that the actuating rod for the eject function is taken along. When moved inward separately, the actuating rods for fast forward and reverse urge a control member aside and can enter the drive mechanism in an unhampered fashion. When the two rods are moved inward together, the control member does not allow to be urged aside; the two actuating rods, when moved inward together, take the control member along together with the actuating rod for the eject function, because the control member is connected to the actuating rod for the eject function. Thus, when the two actuating rods for the fast forward and reverse functions are moved inward together, all three actuating rods enter the drive mechanism as a result of which the eject function is performed.

The key buttons of the actuating rods of manually operated drive mechanisms protrude from the front panel so as to be depressable by hand. Whereas the actuating rods for the fast forward and reverse functions in a three-key drive mechanism constantly protrude from the front panel, the actuating rod for the eject function disappears after the magnetic tape cassette has been inserted or ejected. Key button and actuating rod for the eject function do not protrude from the front panel until a new magnetic-tape cassette is inserted into the drive mechanism and brought into a play position.

Safety standards for car radios require that the operating buttons be as flat as possible and protrude as little as possible from the front panel. Additionally, it makes a good impression on the eye when the key buttons for the drive functions do not protrude. For example, this is the case with a soft-touch apparatus.

If a drive mechanism in a car radio is not utilized, it is not necessary to have the key button of the actuating rod protrude from the front panel. This is only necessary when the drive mechanism is put into operation.

SUMMARY OF THE INVENTION

It is an object of the invention to improve the drive mechanism of a magnetic-tape-cassette apparatus of the type mentioned in the opening paragraph such that for a drive mechanism which is not in operation all key buttons in the front panel of the apparatus have disappeared.

This object is achieved in that the coupling of the actuating rods is provided such that the actuating rods for fast forward and reverse functions are retracted together with the inward movement of the eject actuating rod.

If also the actuating rods for fast forward and reverse functions are retracted when the eject actuating rod is moved inward, no key buttons will protrude from the front panel when the drive mechanism is not used, and the car radio will make the impression of being a radio having soft-touch control, thus a radio having a higher qualification.

According to a further embodiment of the invention it is provided that the actuating rods for fast forward and reverse movement have actuating members which are engaged in a state of rest by a transverse member of the actuating rod for the eject function so that the transverse member takes along the actuating rods for fast forward and reverse movement when the actuating rod for the eject movement is moved inward. When the actuating rod for the eject function is moved inward, the actuating rods for the fast forward and reverse functions are moved inward simultaneously. Since the actuating rod for the eject function remains urged inward until a magnetic-tape-cassette is inserted in the drive mechanism, also the actuating rods for fast forward and reverse functions remain urged inward and are thus retracted and flush with the front panel of the apparatus.

According to a further embodiment of the invention it is provided that the actuating rods for fast forward and reverse functions in outward direction are urged by means of springs and in that these springs pull the actuating rod for the eject functions outward via the actuating rods for fast forward and reverse functions. For the actuating rod for the eject function the spring performing the urge-out function may thus be omitted.

BRIEF DESCRIPTION OF THE DRAWINGS

The invention will be further explained with reference to the drawing in which.

DETAILED DESCRIPTION OF THE PREFERRED EMBODIMENT

Figure 1:
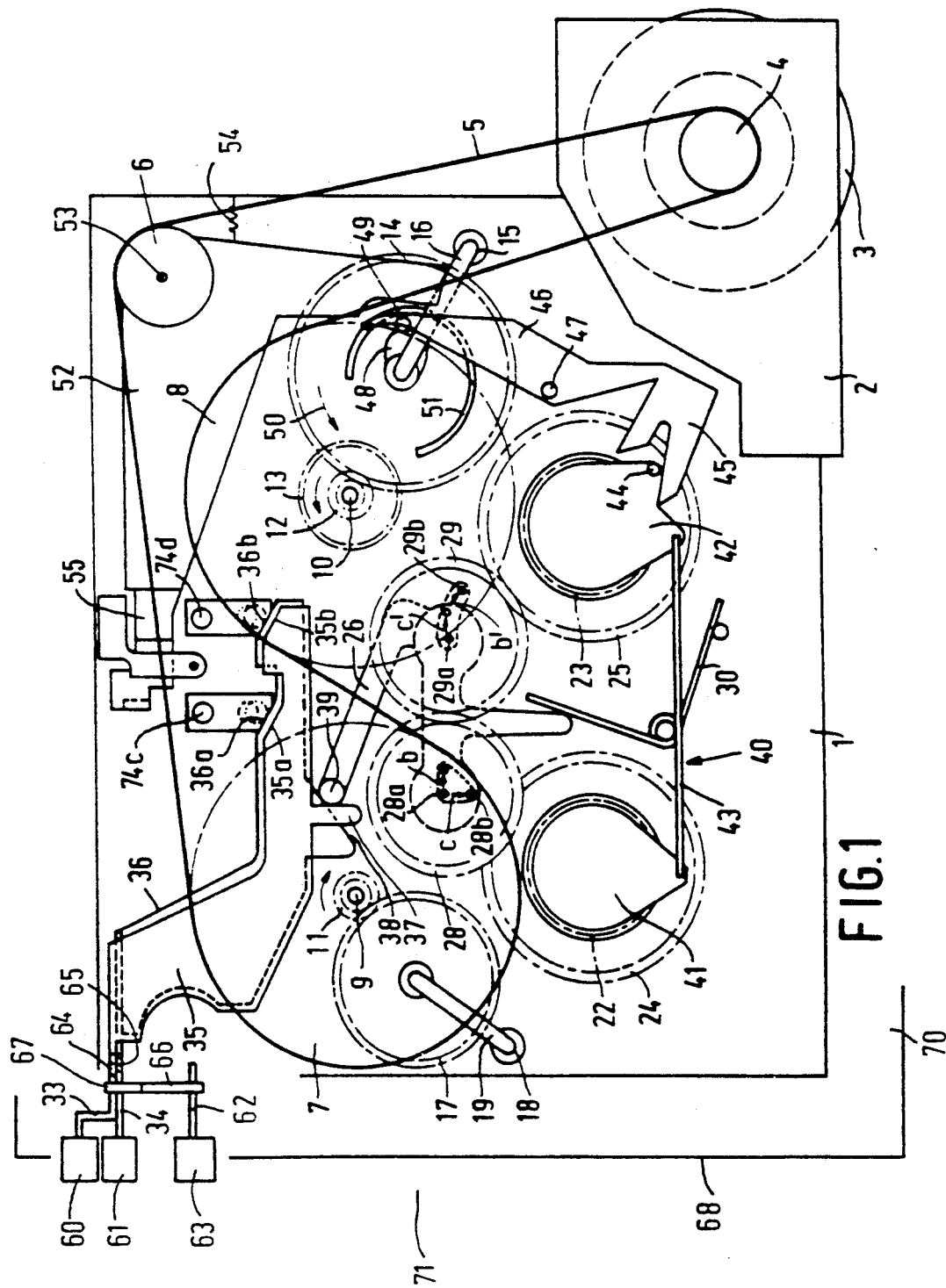
FIG. 1 shows part of a drive mechanism for a magnetic-tape-cassette apparatus having three key buttons.

The magnetic-tape-cassette apparatus 70 according to the invention, as represented in FIG. 1, comprises a frame 1 which carries, by means of a support 2, a drive motor 3 rotating in only one direction. The driving gear 4 of the motor 3 drives a belt 5 which is led over a return wheel 6 over flywheels 7 and 8 in a manner such that the flywheels rotate in opposite directions. The flywheels 7 and 8 are journaled in frame 1. Flywheel 7 is rigidly connected to a capstan 9 and flywheel 8 is rigidly connected to a capstan 10. Furthermore, flywheel 7 engages a gearwheel 11 and flywheel 8 a gearwheel 12. By means of a slipping clutch a further gearwheel 13, arranged coaxially on the gearwheel 12, is rotatably arranged with respect to the flywheel 8. A ratchet 14 arranged as a gearwheel continuously meshes with the gearwheel 12 on flywheel 8. This ratchet 14 can be pivoted around a pivot 15. Pivot 15 supports a swivel arm 16 represented in a diagrammatic manner in FIG. 1, on which arm the ratchet 14 is journalled. In a similar manner a gearwheel 17 meshes with the gearwheel 11. This gearwheel 17 is pivotable around a pivot spindle 18 by means of a swivel arm 19 shown in a diagrammatic manner.

In frame 1 hubs are movably journaled. These hubs are rigidly attached to fast forward wheels 22, 23. Play wheels 24, 25 are connected to the hubs by means of slipping clutches.

Play wheel 25 is driven by gearwheel 12 via ratchet 14 in a manner not shown in the diagram. In a similar manner play wheel 24 is driven via gearwheel 17 by gearwheel 11.

A bracket 26 which is movably journaled in the frame 1, supports two gearwheels 28, 29 arranged beside one another. A spring 30 urges the bracket 26 always into an initial position represented in FIG. 1.

The bracket 26 carries two spindles 28a and 29a which are movable in frame 1 in a triangular opening 28b or a slot 29b respectively.

For fast forward and reverse operations two actuating rods 33 and 34, connected to slides 35 and 36, are arranged beside one another and adjustable in longitudinal direction. These slides 35 and 36 act on bracket 26. For this purpose, slide 35 has a stud 37 and slide 36 accordingly has a stop ramp 38. The stud 37 and the stop ramp 38 act on a pin 39 of the bracket 26. Furthermore, the slides 35, 36 have stop ramps 35a, 35b respectively, 36a, 36b, which may act on pins 74c, 74d of a face plate (not shown).

A detection member 40 comprising two discs 41, 42 and a connecting rod 43, is connected to hubs by means of slipping clutches. On disc 42 a pin 44 is arranged which is positioned in a switching fork 45. Switching fork 45 is arranged on a switch element 46 which is movable around a journal 47. In the middle of gearwheel 14 there is a protrusion formed by a slightly elliptical cam 48. The switch element 46 meshes with gearwheel 14 and carries a pin 49 which, when the switch element 46 has moved in inward direction, can follow cam 48 when the gearwheel rotates in the direction of an arrow 50. At a larger distance around cam 48 a spiral control guide 51 protrudes from the gearwheel 14. This control guide 51 too can co-operate with the pin 49 on the switch element 46 always when the detection member establishes a tape stop. In that case pin 44 no longer presses against the switching fork 45 as a result of which pin 49 of switch element 46 is no longer urged inward in the direction of the cam 48, but remains in position and reaches the outside of the control curve 51 when the gearwheel 14 resumes rotation in the direction of the arrow. Since the control curve 51 is spiral-shaped, the switch element 46 is turned clockwise around its journal 47 so that the switch element 46 is urged against a connecting member 52.

The connecting member 52 is a two-armed lever which is pivoted around a journal 53. The connecting member 52 is spring-loaded clockwise by means of spring 54. Thus, the movement of the switch element 46 tensions spring 54.

The lever arm 55 of the connecting member 52 which arm is turned away from the contact point of the switch element 46 carries a heart-shaped projection which belongs to a pause mechanism which can retain the face plate (not shown) in play condition.

Further details are discussed in U.S. Pat. No. 4,611,254.

The actuating rods 33 and 34 are topped by key buttons 60, 61. In parallel with the actuating rods 33, 34 for fast forward and reverse functions an actuating rod 62 is installed for the eject function of a magnetic-tape-cassette. A key button 63 is arranged on the actuating rod 62.

Figure 2:
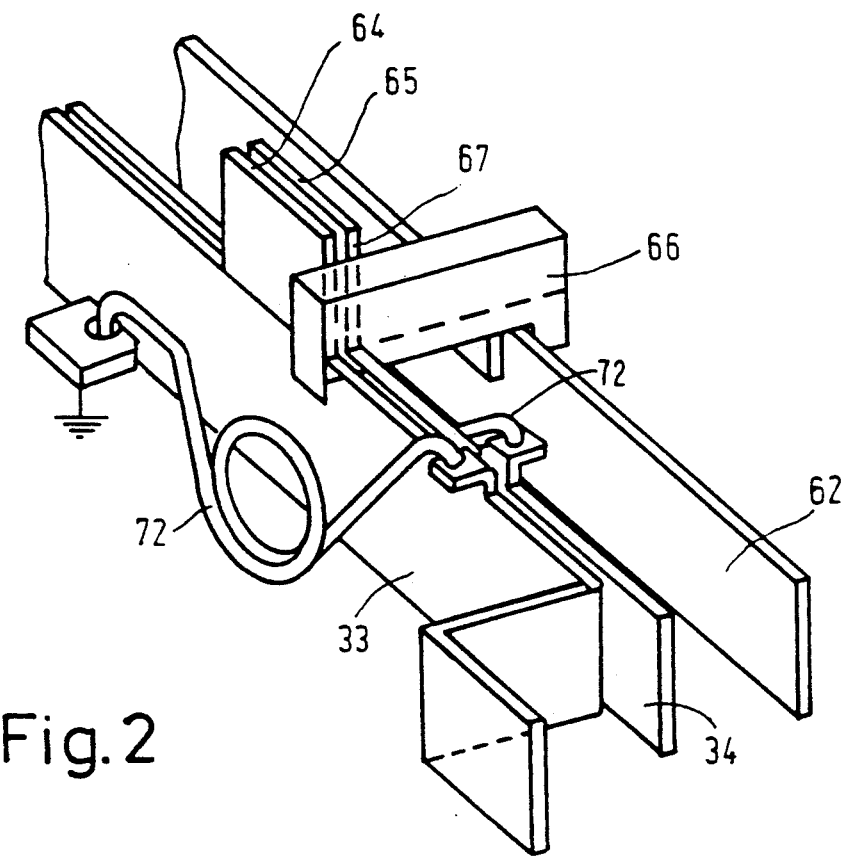
FIG. 2 shows a diagrammatic partial diagram of the three actuating rods of the drive mechanism with their combined functions.

The actuating rods 33 and 34 have actuating elements 64, 65 protruding upward and co-operating with a transverse member 66 of the actuating rod 62 for the eject function (FIG. 2). Transverse member 66 catches behind face 67 of the actuating elements 64, 65 on the side remote from the inside of the drive mechanism.

The front side or front panel 68 of the magnetic-tape cassette apparatus has recesses through which the key buttons 60, 61 and 63 protrude so that they are operable i.e. depressable from the outside 71 of the apparatus.

FIG. 2 shows a diagrammatic representation of the co-operation of the actuating rods 33, 34 and 62. The actuating elements 64, 65 of the actuating rods 33, 34 protrude upward away from the actuating rods 33 and 34 in the drawing as shown in FIG. 2. The transverse member 66 is mounted on the actuating rod 62, for example, by means of moulding. This member meshes before the front side 67 of the actuating elements 64, 65 and thus on the side away from the drive mechanism. In FIG. 2 the transverse member 66 is represented in a transparent manner so that it can be perceived better how it meshes before the front side 67 of the actuating elements 64, 65.

The two actuating rods 33, 34 are loaded in outward direction by means of springs 72. When a magnetic-tape cassette has been inserted, the actuating rod 62 is loaded in outward direction in a manner not shown per se and urged out, whereas it assumes a retracted position when the magnetic tape cassette is ejected.

Figure 3:
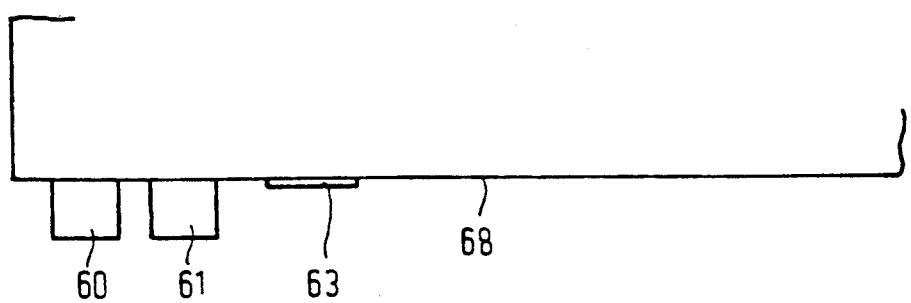
FIG. 3 shows the conventional position of the key buttons of manually operated car radios when a cassette is ejected.

FIG. 3 shows the mutual position of the key buttons 60, 61 and 63 when the magnetic-tape cassette is ejected in the state of the art. The key buttons 60 and 61 according to the representation of FIG. 3 are raised while the key button 63 is pushed into the front panel 68 and disappears therein completely or almost completely. If a magnetic-tape cassette is inserted into the drive mechanism, the actuating rod 62 with its key button 63 abruptly appears and all three buttons 60, 61 and 63 are positioned either equidistant from the front panel 68 or the key button 63 protrudes even slightly more.

Figure 4:
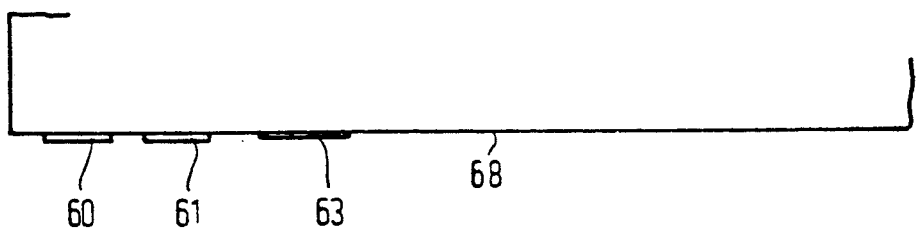
FIG. 4 represents the position of the key buttons when utilizing the transverse member as shown in FIGS. 1 and 2.

When the actuating elements 64 and 65 as well as the transverse member 66 are used, the picture represented in FIG. 4 can be observed when a magnetic-tape cassette is removed from the drive mechanism. In addition to the key button 63, the key buttons 60 and 61 are also retracted to the front panel 68 when the magnetic tape cassette is ejected, i.e. when the drive mechanism is switched off, and all three key buttons 60, 61, 63 are in line almost or substantially completely hidden in the apparatus. If a cassette is inserted into the drive mechanism, one of the springs 72 of the actuating rods 33, 34 for fast forward and reverse functions urges out all actuating rods. Since the actuating elements 64, 65 take along the actuating rod 62 for the eject movement via transverse member 66, a spring for urging the actuating rod 62 outward may be omitted.

I claim:

1. Magnetic-tape-cassette apparatus comprising a manually operable cassette drive and including three key buttons each being connected to a respective associated actuating rod which rods respectively actuate the fast forward and reverse functions as well as the eject function for the cassette drive wherein a coupling member couples the actuating rod for the eject function to the actuating rods for the fast forward and reverse functions such that movement of the actuating rod for the eject function in an inwardly direction in the apparatus moves the actuating rods for the fast forward and reverse functions in said inwardly direction, and wherein spring means biases the actuating rods for the fast forward and reverse functions in a direction opposite said inwardly direction, said transverse member moving said actuating rod for the eject function in said opposite direction together with the actuating rods for the fast forward and reverse functions.

2. A magnetic-tape-cassette apparatus according to claim 1, wherein said coupling means comprises a respective projection on each of said second and third actuating rods and a coupling member on said first actuating rod.

3. A magnetic-tape-cassette apparatus according to claim 2, wherein said projections extend adjacent each other in the same direction, each including a respective face facing in said outward direction of the apparatus, and said coupling member is a transverse arm extending transverse to said actuating rods and is engageable with said faces.

4. A magnetic-tape-cassette apparatus comprising cassette drive means for driving a tape cassette loaded in said apparatus in a plurality of operating modes, said drive means including first, second, and third actuating rods each manually depressable in an inward direction of said apparatus from a first position to a second position for actuating an associated said operating mode, wherein the improvement comprises:

coupling means for coupling said first actuating rod to said second and third actuating rods such that upon depression of said first actuating rod from said first position to said second position said second and third actuating rods are moved from said first position to said second position.

5. A magnetic-tape-cassette apparatus according to claim 4, wherein said coupling means couples said actuating rods to each other such that upon movement of one of said second and third actuating rods in an outward direction of said apparatus from said second position to said first position said first actuating rod is urged from said second position to said first position.

6. A magnetic-tape-cassette apparatus according to claim 5, wherein said coupling means comprises a respective projection on each of said second and third actuating rods and a coupling member on said first actuating rod.

7. A magnetic-tape-cassette apparatus according to claim 6, wherein said projections extend adjacent each other in the same direction, each including a respective face facing in said outward direction of the apparatus, and said coupling member is a transverse arm extending transverse to said actuating rods and is engageable with said faces.

8. A magnetic-tape-cassette apparatus according to claim 7, further comprising a respective spring biasing each of said second and third actuating rods in the outward direction, and said first actuating rod is free of a said spring.

9. A magnetic-tape-cassette apparatus according to claim 5, further comprising a respective spring biasing each of said second and third actuating rods in the outward direction, and said first actuating rod is free of a said spring.

10. A magnetic-tape-cassette apparatus, comprising:
a) a faceplate;
b) first, second and third actuating rods;
c) first, second, and third buttons each connected to a respective actuating rod, said buttons each being manually depressable towards said faceplate from a first actuating rod position, in which said each button protrudes from said faceplate, to a second actuating rod position, in which said each button is at least substantially flush with said faceplate, for actuating an associated function of said apparatus; and
d) coupling means for coupling said first actuating rod to said second and third actuating rods such that upon depression of said first actuating rod from said first position to said second position said second and third actuating rods are moved from said first position to said second position.

11. A magnetic-tape-cassette apparatus according to claim 10, wherein said coupling means couples said actuating rods to each other such that upon movement of one of said second and third actuating rods in an outward direction of said apparatus from said second position to said first position said first actuating rod and said first button are moved from said second position to said first position.

12. A magnetic-tape-cassette apparatus according to claim 11, wherein said coupling means comprises a projection on each of said first and second actuating rods, said projections extending in the same direction and including a respective face facing in the outward direction of said apparatus towards said buttons, and a transverse coupling arm on said first actuating rod extending transversely in the direction of said projections between said projections and said faceplate, said arm being engageable with said projections for moving said second and third actuating rods inwardly upon depression of said first button from said first to said second position and for being engaged by said faces of said projection to move said first button outwardly from said second position to said first position upon outward movement of one of said second and third buttons from said second to said first position.

13. A magnetic-tape-cassette apparatus according to claim 12, further comprising a respective spring biasing each of said first and second actuating rods in the outward direction, and said first actuating rod is free of a said spring.

14. A magnetic-tape-cassette apparatus according to claim 13, further comprising:
a cassette load/eject means for loading and ejecting a cassette into/from said apparatus;
said first actuating road being connected to said cassette load means such that upon depression of said first button to said second position said cassette is ejected from said cassette load/eject means and said second and third buttons are moved to said second position; and wherein said second and third buttons are connected to said cassette eject/load means such that upon loading of a cassette into said apparatus, said second and third actuating rods are urged outwardly by said springs, moving each of said actuating buttons from said second to said first position.

15. A magnetic-tape-cassette apparatus according to claim 12, further comprising:
   a cassette load/eject means for loading and ejecting a cassette into/from said apparatus;
   said first actuating rod being connected to said cassette load/eject means such that upon depression of said first button to said second position, said cassette is ejected from said cassette load/eject means and said second and third buttons are moved to said second position.

16. A magnetic-tape-cassette apparatus according to claim 11, further comprising:
   a cassette load/eject means for loading and ejecting a cassette into/from said apparatus;
   said first actuating rod being connected to said cassette load/eject means such that upon depression of said first button to said second position, said cassette is ejected from said cassette load/eject means and said second and third buttons are moved to said second position.

17. A magnetic-tape cassette apparatus according to claim 10, further comprising:
   a cassette load/eject means for loading and ejecting a cassette into/from said apparatus;
   said first actuating rod being connected to said cassette load/eject means such that upon depression of said first button to said second position, said cassette is ejected from said cassette load/eject means and said second and third buttons are moved to said second position. d

* * * * *